United States Patent
Conboy et al.

[19]

[11] Patent Number: 5,818,018
[45] Date of Patent: Oct. 6, 1998

[54] REFLECTIVE/REFRACTIVE OPTICAL BAR CODE SCANNING THROUGH A TRANSPARENT/TRANSLUCENT APPARATUS

[75] Inventors: Michael R. Conboy, Buda; Danny C. Shedd; Elfido Coss, Jr., both of Austin, all of Tex.

[73] Assignee: Advanced Micro Devices, Inc., Sunnyvale, Calif.

[21] Appl. No.: 826,487

[22] Filed: Mar. 27, 1997

[51] Int. Cl.$^6$ ................................................. G06K 13/00
[52] U.S. Cl. ........................ 235/375; 235/462; 235/475
[58] Field of Search ................................. 235/375, 462, 235/475

[56] References Cited

U.S. PATENT DOCUMENTS

| | | | |
|---|---|---|---|
| 4,757,355 | 7/1988 | Iizuka et al. ............................... | 335/75 |
| 5,015,832 | 5/1991 | Filipski et al. ........................... | 235/462 |
| 5,298,727 | 3/1994 | Spratte et al. ........................... | 235/462 |
| 5,389,769 | 2/1995 | Yamashita et al. ...................... | 235/375 |
| 5,406,060 | 4/1995 | Gitin ........................................ | 235/462 |

*Primary Examiner*—Don Wong
*Attorney, Agent, or Firm*—Eric A. Stephenson; Conley, Rose & Tanyon, P.C.

[57] ABSTRACT

A scanning system for scanning bar codes attached to wafer cassettes received in a chamber of a wafer processing tool. The system includes a scanner positioned external to the chamber for reading the bar codes and generating signals indicative thereof. Light generated by the scanner passes through an opening in the chamber wall and reflects off one or more reflective or refractive members positioned internal to the chamber, to illuminate the bar code attached to a wafer cassette contained in the chamber. Light reflected from the bar code likewise is bent by the reflective or refractive members and passes through the wall opening where it is sensed by the scanner. The reflective or refractive members are positioned so that the scanner can read bar codes which are not within the line of sight of the scanner through the wall opening. Once the bar code is read, the scanner generates a signal which can be used to access a database stored in memory which contains information related to wafers contained in the cassettes identified by the bar codes.

19 Claims, 4 Drawing Sheets

REFLECTIVE/REFRACTIVE OPTICAL BAR CODE SCANNING THROUGH A TRANSPARENT/TRANSLUCENT APPARATUS

BACKGROUND OF THE INVENTION

1. Field of the Invention

The present invention relates generally to the art of tracking silicon wafers during semiconductor manufacturing and, more particularly, to an apparatus and method for identifying wafers contained inside a process tool chamber using bar code scanning through an aperture in the process tool chamber.

2. Description of the Relevant Art

Semiconductor manufacturing involves applying a succession of predetermined processing steps to silicon wafers. Each process step typically involves using one of several different types of process tools including ion implanters, annealers, etchers, etc. Between process tools and steps, the wafers are transported in wafer holders called cassettes. These cassettes, also called boats, can hold a significant number of wafers to be processed identically. The cassettes display a scanner bar code on the side thereof. The bar code is coded with information relevant to the wafers contained within the cassette.

Prior to the present invention, cassettes of wafers were tracked between tools to ensure that the wafers were properly directed to the next tool for subsequent processing. The cassettes of wafers were tracked by technicians using hand-held bar code scanners (not shown). More particularly, a technician would remove a cassette of wafers from one tool after processing and scan the bar code displayed on the side of the cassette before loading the cassette into the subsequent tool. Information scanned from the bar code is used to access a data base which identifies the next scheduled step or tool in the processing sequence. Further, the database may provide processing parameters, e.g., anneal temperature, etc., at which the next scheduled tool is to process the wafers. Hand scanning cassettes often times results in the wrong cassette of wafers being loaded into the wrong process tool. Unless the oversight is detected, the wafers will be misprocessed and will have to be discarded.

Furthermore, because the cassettes of wafers are scanned between process tools, the wafers are subject to airborne contamination. More particcularly, process tools are contained in clean room environments which employ sophisticated filter systems to remove significant amounts of airborne particle contaminants. Notwithstanding this, a significant amount of contaminants escape the filter system and remain in the clean room. These contaminants may become airborne and land on the surface of an unprotected wafer thereby creating shorts or other performance deformities in the underlying semiconductor device. Unfortunately, the risk of particle contamination is increased by scanning the cassettes of wafers between process tools using hand-held scanner since movement of the hand-held scanner disrupts particles resting thereon thus causing the particles to become airborne near the cassettes. Once airborne, there is an increased chance that the wafer will be contaminated.

Many process tools contain two chambers. A first chamber provides the area where the wafers are individually processed, e.g., etched. The second chamber, called a load lock chamber, provides a staging area where the wafers are held before or after processing in the first chamber. The load lock chamber is generally a particle free environment having a window formed through an opaque wall which allows external viewing of the cassettes contained within the load lock chamber. One solution to the above-mentioned problems of wafer misprocessing and wafer particle contamination during hand-held scanning of bar codes between process tools, is to scan the cassettes of wafers through the window after the cassettes have been loaded into the load lock chamber. Scanning the cassettes after they are loaded in the load lock chamber protects against particle contamination in general and particle contamination caused by movement of hand-held scanners. Further, scanning after loading cassettes into the load lock chamber allows operators to confirm that the process tool is properly loaded before the wafers are processed thereby. Unfortunately, the window, transparent and prepositioned, does not provide a line of sight between the scanner and the bar code displayed on the side of the cassette. In other words, the scanner cannot see the bar code through the load lock window. Accordingly, bar code scanning as the cassette is held within the load lock chamber cannot be accomplished.

SUMMARY OF THE INVENTION

The problems outlined above are in large part solved by the present invention which provides a reflective or refractive member positioned proximate to a preexisting load lock chamber window to provide a light path between a cassette bar code in the chamber and a non-aligned externally positioned scanner. In this configuration, the scanner can read the bar code displayed on the cassette while the cassette is positioned within the high vacuum, generally particle-free environment of the load lock chamber notwithstanding the lack of direct line of sight between the bar code and scanner. Accordingly, the cassette and wafers contained therein can be scanned without subjecting the wafers to the risk of particle contamination. Moreover, by scanning the cassettes of wafers after they have been loaded within the chamber, a confirmation can be made that the wafers are loaded in the proper process tool before processing thereby which, in turn, reduces the risk of wafer misprocessing.

The light path is provided by positioning the reflective or refractive number within the load lock chamber near the transparent window formed through the opaque wall thereof. The reflective or refractive member is angled so that scanner light generated by the externally positioned scanner is reflected or refracted to illuminate the bar code of the cassette. Further, light reflected from the bar code is reflected or refracted back through the window by the reflective or refractive member where it is detected by the scanner.

One advantage of the present invention is that it reduces the risk that wafers can be scanned without being exposed to contamination particles.

Another advantage of the present invention is that it insures proper tracking of wafers thereby avoiding process tool misleading.

Yet another advantage of the present invention is that it reduces cycle time to complete wafer processing by eliminating the step of scanning cassettes between process tools using a hand-held scanner which in turn reduces labor needed.

Still another advantage of the present invention is that it allows bar codes on cassettes to be scanned while the cassette is in the chamber notwithstanding the lack of alignment between the bar code, the chamber window, and the scanner.

BRIEF DESCRIPTION OF THE DRAWINGS

Other objects and advantages of the invention will become apparent upon reading the following detailed description and upon reference to the accompanying drawings in which.

Figure 1:
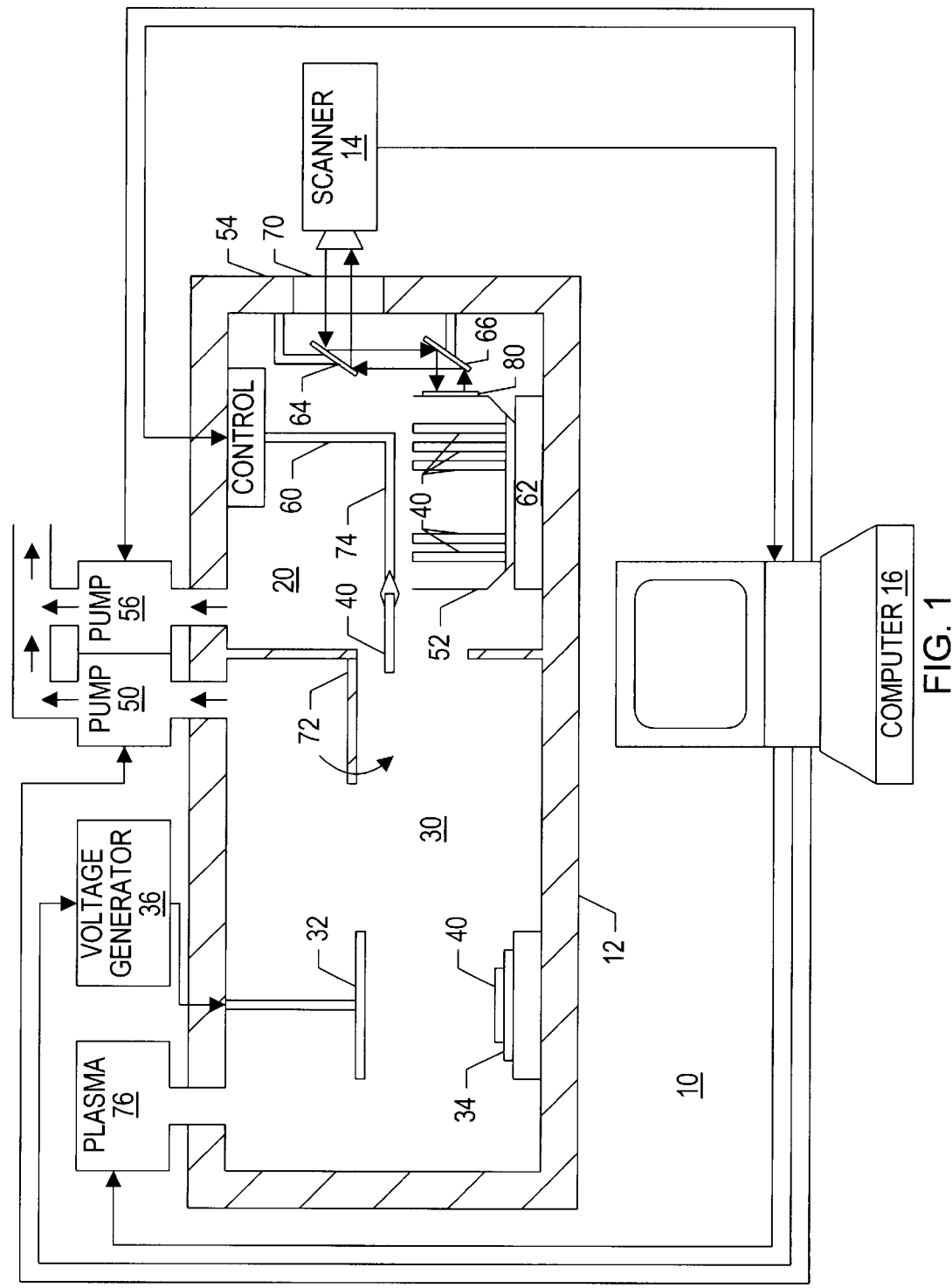
FIG. 1 shows a partial side view of a semiconductor process tool employing the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular formed disclosed, but on the contrary, the intention is to cover all modifications, equivalents, and alternatives falling within the spirit and scope of the present invention as defined by the appended claims.

DETAILED DESCRIPTION OF THE PREFERRED EMBODIMENTS

FIG. 1 shows a silicon wafer processing apparatus employing the present invention. The silicon wafer processing apparatus 10 includes a process tool 12, a scanner 14, and a general purpose computer 16 coupled to the process tool 12 and a scanner 14. The process tool 12 includes a load lock chamber 20 which acts as a staging area for wafers prior to or after their processing as will be more fully described below. The present invention can be employed with any number of process tools having load lock chambers such as ion implanters, annealers, etchers, etc. FIG. 1 describes the silicon wafer processing apparatus 10 with process tool 12 defined by a semiconductor etching device, it being understood that the present invention is employable with other kinds of process tools having a load lock chamber 20 or other simlar structure.

There are several etching techniques commonly used to etch silicon wafers, including plasma etching or a combination of plasma/reactive ion etching (RIE). Plasma and RIE techniques, often called dry etching, are relatively new and are performed under low pressure gaseous plasma. Dry etching generally involves fewer safety hazards, less spent chemical disposable problems, and also produces finer line geometric constructions.

Dry etching generally requires an etching chamber 30 capable of receiving gaseous etchant and a wafer 40. The etchant can be pressurized within the chamber 30. Operating pressure of the gaseous etchant is one of many process parameters which depends on the material being etched, the gas etchant chosen, and may range from a few torr to fractions of a millitorr. After wafer etching is completed, the gaseous material and volatile by-products can be pumped out or evacuated from chamber 30.

Etching chamber 30 includes a pair of electrodes 32 and 34 at opposing sides or ends of the chamber. Electrode 32 is charged by computer controlled RF voltage supply 36, while the other electrode 34 is grounded. Negative electron charge accumulates upon the powered electrode during one half of the RF cycle while positive ion charge accumulates during the next cycle. Since electrons are more mobile than ions, a negative potential will build upon the powered electrode which charges electrode 32 negative with respect to the grounded electrode 34 and the gaseous plasma disposed between the electrodes. Depending upon parameters, i.e., plasma pressure, set by general purpose computer 16, the voltage differential between the two electrodes may be several hundred volts.

Etching of wafer 40 is achieved when wafer 40 receives positive ions directed from the plasma in response to the RF voltage applied to upper electrode voltage 32. The ions chemically or mechanically react at the surface of wafer 40 and cause an etching therein. Upon completion of the wafer etch, computer 16 directs pump 50 to evacuate chamber 30 and create a high vacuum therein.

Load lock chamber 20 is configured to receive cassette 52 containing wafers 40. Load lock chamber 20 provides a contamination-free environment where wafers can be held before and after they are etched in chamber 30. The load lock chamber 20 acts as a particle free interface between etching chamber 30 and a room in which the etcher is contained. In other words, the load lock chamber allows wafers to be moved into and out of etching chamber 30 without having to directly expose etching chamber 30 to the particle-contaminated environment in which etcher 12 is contained.

Load lock chamber 20 is generally defined by an opaque wall 54 and inclues a pump 56, a robot 60 for moving wafers between the load lock chamber 20 and etching chamber 30, cassette support 62, and a pair of light bending numbers 64 and 66 positioned proximate to a light transparent window 70 formed through opaque wall 54.

As noted above, load lock chamber 20 acts as a staging area for wafers 40. After cassette 52 is placed into load lock chamber 20 and an access door (not shown) is closed, pump 56 operates to create a high level, particle-free vacuum. Ideally, this vacuum should equal the vacuum established in etching chamber 30 by pump 50. Once the atmospheres in the two chambers equalized, door 72 opens thereby providing access between the two chambers. Robot arm 74 selects a wafer 40 from cassette 62, passes the selected wafer through the opening between the chambers, and places the selected wafer on lower electrode 34. Robot arm 74 retrieves back into load lock chamber 20, door 72 closes, thereby isolating etched chamber 30 from load lock chamber 20, and the etching chambered is directed by computer 16 to proceed through an etch cycle.

General purpose computer 16 controls plasma source 76, voltage generator 36, etch chamber pump 50 and a load lock pump 56. General purpose computer 16 acting in connection with plasma source 76, sets process parameters such as plasma density, temperature, etc., in accordance with predefined instructions which may be stored in memory of the computer 16. Wafer 40 is subjected to an etch with process parameters set to predefined values. It becomes important that each particular wafer 40 must be etched with process parameters properly set. If the parameters are not properly set, wafer 40 will be misprocessed and rendered unusable. After wafer 40 has been properly etched, general purpose computer 16 directs pump 50 to evacuate all etching byproducts from chamber 30 to return chamber 30 to its original high vacuum state, which vacuum equals the vacuum in load lock chamber 20. Door 72 opens allowing robot arm 74 to retrieve the etched wafer 40 which is returned to cassette 52. Subsequent thereto robot arm 74 selects the next wafer 40 for etching.

Scanner 14 is preferably a bar code scanner. Ideally, scanner 14 is in data communication with general computer 16. General purpose computer 16 can store information relating to wafers held in load lock chamber 20. More particularly, computer 16 may store information relating to the sequence of process steps to which wafer 40s are to be subjected including the etching step performed within chamber 30. Further, computer 16 can store information relating to the process parameters controlling etching chamber 30. This information stored in general computer 16 can be accessed by signals outputted by scanner 14 and downloaded into the etcher 12.

Figure 2:
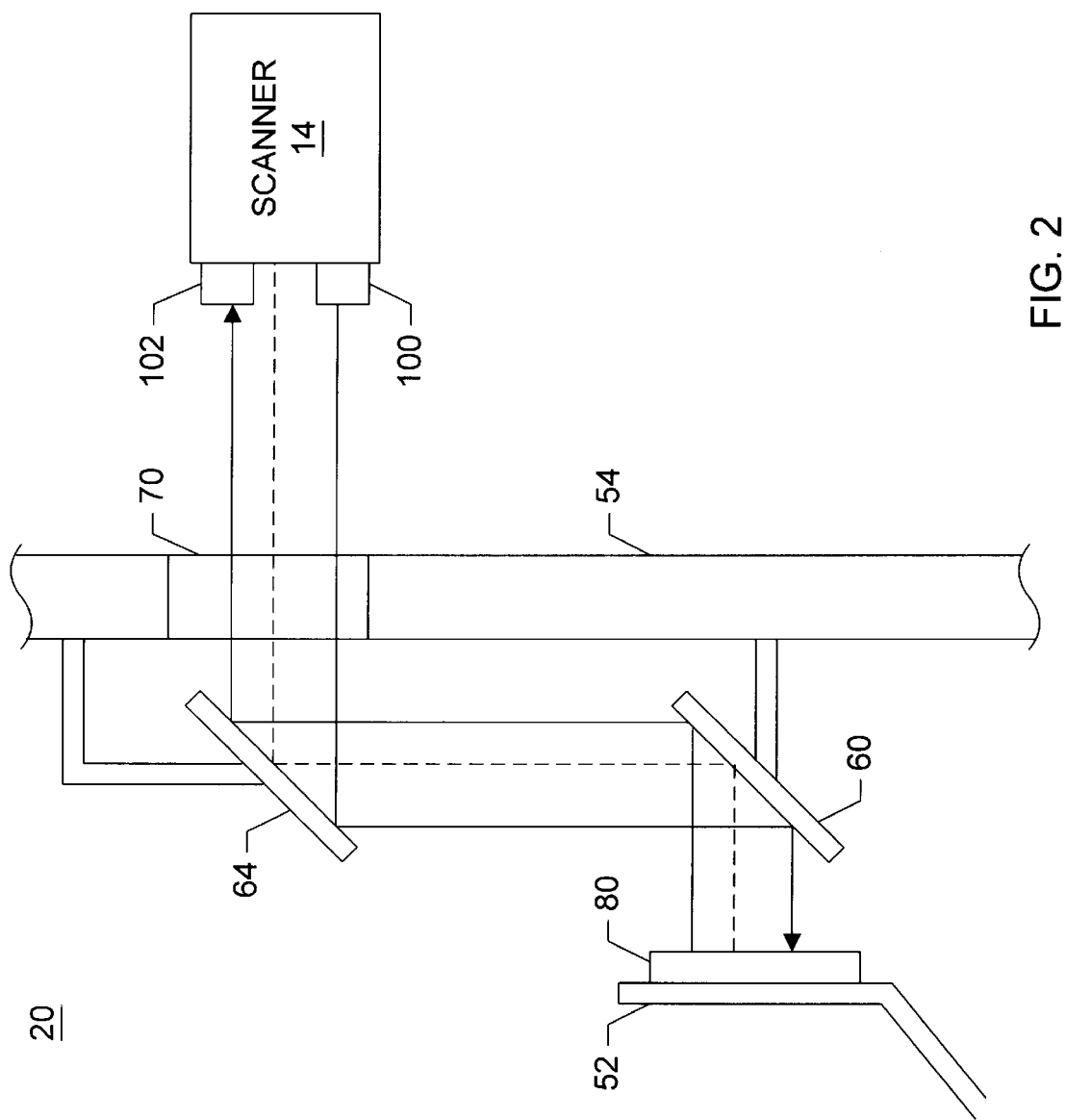
FIG. 2 is a cross-sectional view of a chamber employing one embodiment of the present invention.

With reference to FIG. 2, which shows one embodiment of the present invention, scanner 14 is shown as being aligned with window 70 formed through the opaque wall 54 of load lock chamber 20. Light bending member 64 is also aligned with window 70 and scanner 14. In one embodiment, light bending member 64 is a reflective mirror attached to one end of an arm, the other end of the arm being attached to an interior surface of wall 54. Second light bending member 66, in one embodiment, also includes a reflective member attached to one end of an arm, the other end of the arm being attached to an interior surface of wall 54. The first and second light bending members 64 and 66 are positioned and angled so that scanning light generated by scanner 14 is redirected to illuminate scanable lable or bar code 80 displayed on the side of cassette 52. Further, first and second light bending members 64 and 66 are positioned and angled so that light reflected from bar code 80 is redirected to and detected by scanner 14. It is to be noted that bar code 80 is not aligned with window 70. Accordingly there is no direct line of sight between bar code 80 and scanner 14. The first and second light bending members 64 and 66, however, indirectly create a line of sight between the bar code 80 and scanner 14 by bending the light path therebetween. In this manner, bar code 80 can be scanned while cassette 52 is contained within load lock chamber 20 notwithstanding the fact that there is no direct line of sight between bar code 80 and scanner 14. It is to be further noted that although first and second light bending members 64 and 66 were described as containing reflective mirrors, first and second light bending members may contain other light bending devices including those with refractive mediums.

Figure 3:
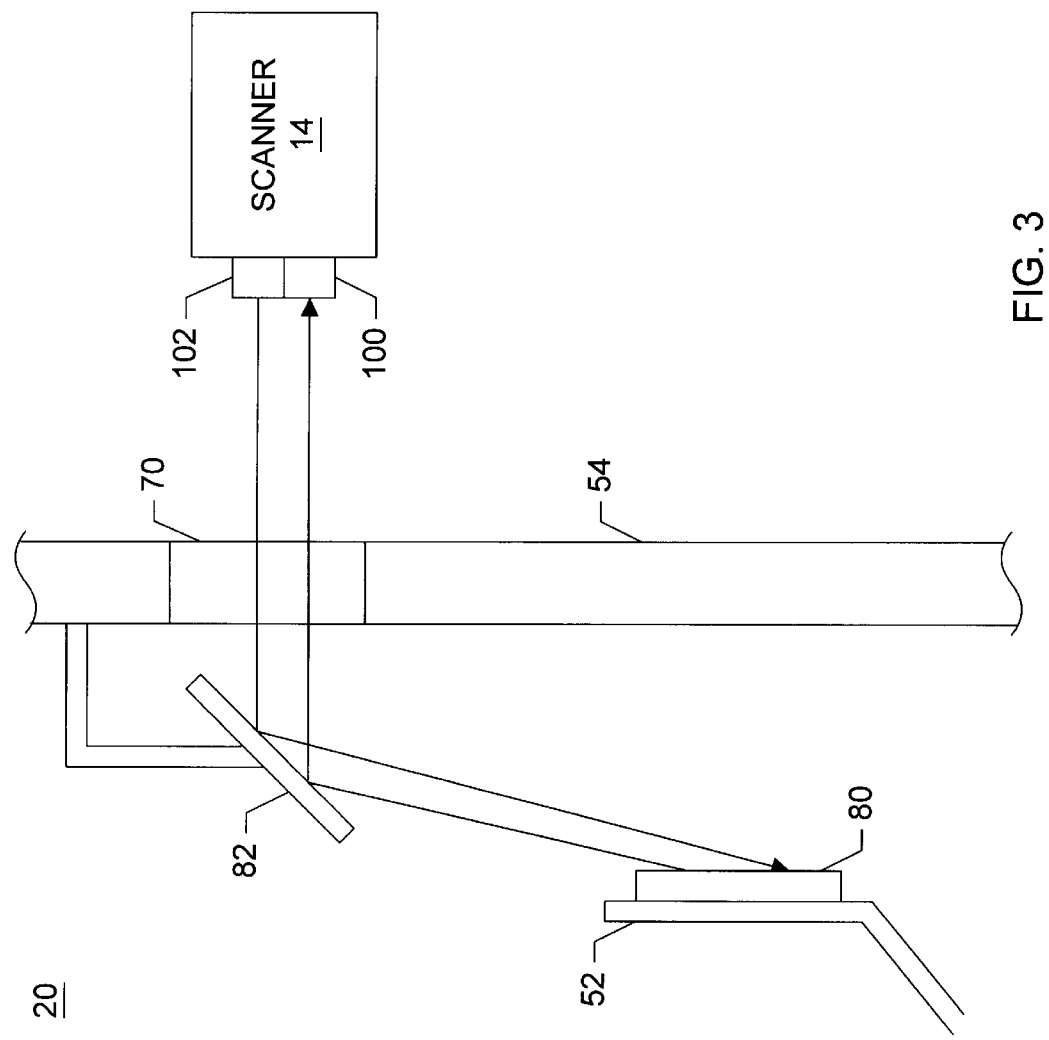
FIG. 3 is a cross-sectional view of the chamber employing a second embodiment of the present invention.

FIG. 3 shows a second embodiment of the present invention. Here a single light bending member 82 is positioned internally within the load lock chamber 20 and angled so that scanning light generated by a scanner 14 is redirected to illuminate bar code 80, and light reflected from bar code 80 is redirected to scanner 14. In this embodiment, the single light bending member 82 might consist of a reflective mirror connected to one end of an arm, the other end of the arm being connected to the interior surface of wall 54. As in the first embodiment, the single light bending member 82 is generally aligned with window 70 and scanner 14. This allows scanner 14 to read bar code 80 notwithstanding the misalignment between bar code 80 and window 70.

Figure 4:
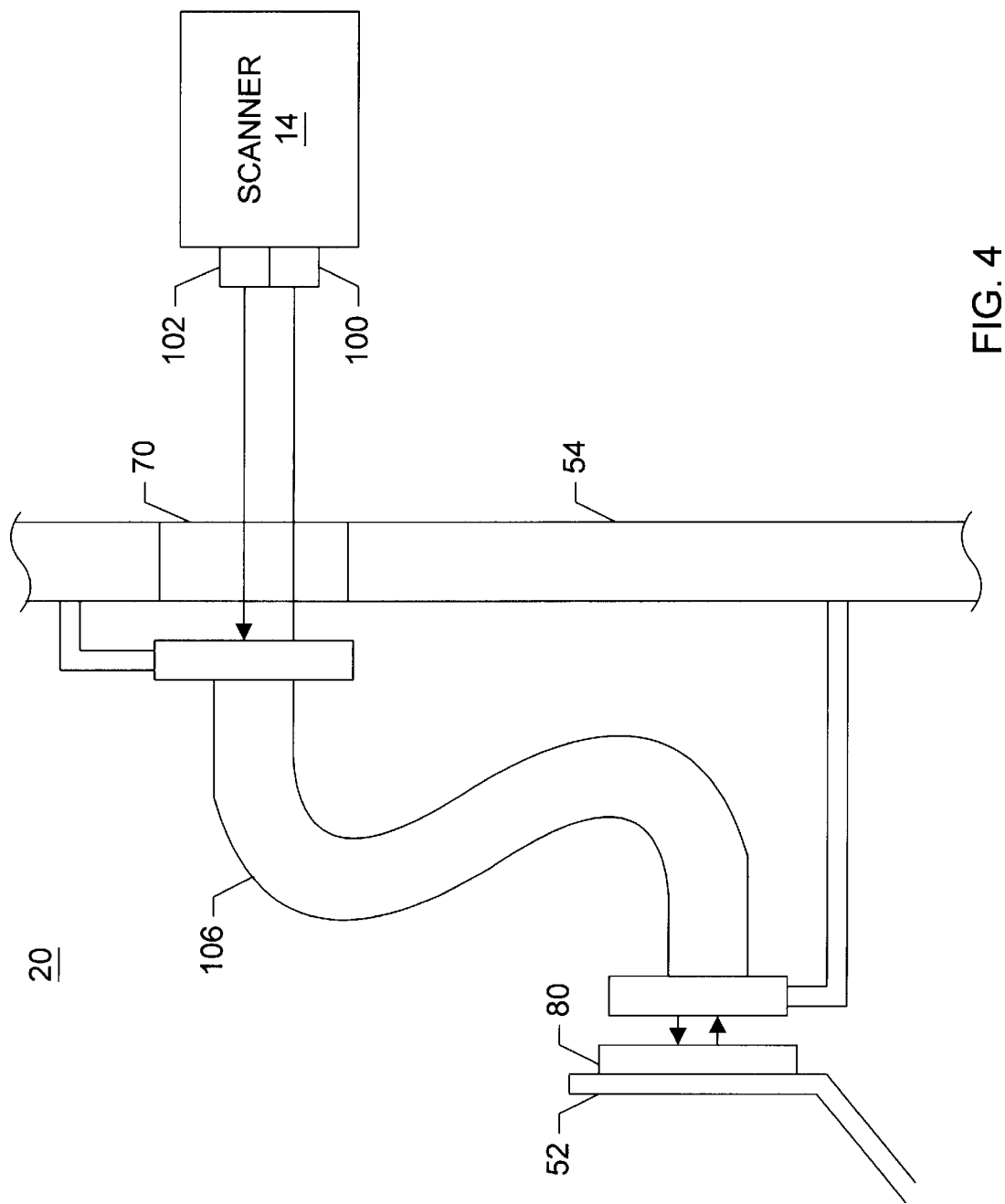
FIG. 4 is a cross-sectional view of the chamber employing a third embodiment of the present invention.

FIG. 4 shows a third embodiment of the present invention. Here a single light bending member 106 is defined as a flexible fiber optical cable. Light bending member 106 is positioned internally within the load lock chamber 20 and configured so that scanning light generated by scanner 14 is redirected to illuminate the bar code 80, and light reflected from bar code 80 is redirected to scanner 14. In this embodiment, the single light bending member 106 has one end positioned near window 70 and another end positioned near bar code 80. This allows scanner 14 to read bar code 80 notwithstanding the misalignment between bar code 80 and window 70. Further, light bending member 106 as defined by a fiber optic cable can be routed in a number of directions or through subsequent opaque walls to provide a light path between scanner 14 and an even more remotely positioned bar code 80.

Scanner 14 (see FIG. 1) includes a light generation device 100 and a light sensor 102. Light generator 100 generates the light which illuminates bar code 80 after redirection by first and second light numbers 64 and 66. Light sensor 102 detects light reflected from bar code 80 after being redirected by first and second light bending members 64 and 66. Light sensor 102 generates a signal indicative of the information contained in bar code 80 from the reflected light. The signal is transmitted by scanner 14 to computer 16 where it is used to access relevant memory relating to wafers 40 contained within cassette 52. This data includes the next processing step scheduled for the cassette of wafers and possibly the parameters at which the next process tool is to be operated.

Since scanner 14 reads bar code 80 while cassette 52 is contained within the high vacuum atmosphere of load lock chamber 20, wafers 40 are protected against particle contamination which would otherwise occur upon scanning wafers 40 outside of load lock chamber 20 using a hand-held scanner. Moreover, since computer 16 is provided with information necessary to properly process wafers 40, there is a reduced risk that wafers 40 will be misprocessed.

It would be appreciated to those skilled in the art having the benefit of this disclosure that this invention is believed to be capable of being applied with numerous types of semiconductor processing tools. Various modifications and changes may be made without departing from the spirit and scope of the invention as set forth in the claims. It is intended that the following claims be interpreted to embrace all such modifications and changes to the foregoing invention description.

What is claimed is:

1. An apparatus for scanning labels attached to wafer cassettes received in a chamber of a wafer processing device, the apparatus comprising:

a scanner positioned external to the chamber, for reading the labels and generating signals indicative thereof, said scanner having a light source for generating light which illuminates the labels and a light sensor for detecting light reflected from illuminated labels;

an opening formed through an opaque wall of the chamber for passing light generated by the scanner and light reflected from illuminated labels;

a first light bending member positioned internal to the chamber, for bending light generated by the scanner and light reflected from illuminated labels.

2. The apparatus of claim 1 further comprising a second light bending member positioned internal to the chamber, for bending light generated by the scanner and light reflected from illuminated labels.

3. The apparatus of claim 2 wherein the first and second light bending members have a mirrored surface for bending light generated by the scanner and light reflected from illuminated labels.

4. The appparatus of claim 1 wherein the first light bending member is defined by a prism.

5. The apparatus of claim 1 wherein the first light bending member is defined by a fiber optic cable.

6. The apparatus of claim 3 wherein the first light bending member, the opaque wall opening and the scanner are aligned with a first axis, and the second light bending member is aligned with a second axis wherein the second axis is parallely spaced from the first axis.

7. The apparatus of claim 6 wherein light generated by the scanner and light reflected from illuminated labels travel along both the first and second axes.

8. The apparatus of claim 7 further comprising a light transperent member positioned in the opaque opening in alignment with the first axis.

9. The apparatus of claim 7 wherein labels illuminated with scanner generated light, are aligned with the second axis when the cassettes with attached labels are received in the chamber.

10. The apparatus of claim 1 further comprising a general purpose computer in data communication with the scanner, wherein the general purpose computer includes a memory for storing information related to wafers contained in cassettes received in the chamber, wherein the memory is indexable by signals generated by the scanner.

11. A silicon wafer processing apparatus comprising:
   a first chamber for processing silicon wafers;
   a second chamber operatively connected to the first chamber, for receiving cassettes having labels attached thereto, said second chamber having an opaque wall with an opening formed therethrough;
   a scanner positioned external to the second chamber, for reading the labels and generating signals indicative thereof, said scanner having a light source for generating light to illuminate the labels, a light sensor for detecting light reflected from illuminated labels, wherein light generated by the scanner and light reflected from the illuminated labels pass through the opening formed through the opaque wall;
   a first light bending member positioned internal to the second chamber for bending light generated by the scanner and light reflected from illuminated labels.

12. The silicon wafer processing apparatus of claim 11 further comprising second light bending member positioned internal to the second chamber, for bending light generated by the scanner and light reflected from illuminated labels.

13. The silicon wafer processing apparatus of claim 12 wherein the first and second light bending members have a mirrored surface for bending light generated by the scanner and light reflected from the illuminated labels.

14. The silicon wafer processing apparatus of claim 13 wherein the first and second light bending members include a refractive member for bending light generated by the scanner and light reflected from the illuminated labels.

15. The silicon wafer processing apparatus of claim 14 wherein the first light bending member, the opaque wall opening and the scanner are aligned with a first axis, and the second light bending member is aligned with a second axis wherein the second axis is parallely spaced from the first axis.

16. The silicon wafer processing apparatus of claim 15 wherein light generated by the scanner and light reflected from the illuminated labels travel along both the first and second axes.

17. The silicon wafer processing apparatus of claim 16 wherein labels illuminated with scanner generated light are aligned with the second axis when cassettes with attached labels are received in the second chamber.

18. The silicon wafer processing apparatus of claim 17 further comprising a general purpose computer and data communication with the scanner wherein the general purpose computer includes a memory for storing information related to wafers contained and cassettes received in the second chamber, wherein the memory is indexable by signals generated by the scanner.

19. The silicon wafer processing apparatus of claim 18 wherein the labels attached to the cassettes are defined by bar codes, wherein the bar codes contain information related to wafers contained within the cassettes.

* * * * *